United States Patent [19]

Rail

[11] Patent Number: 5,740,431
[45] Date of Patent: Apr. 14, 1998

[54] CONFIGURATION FILE MANAGEMENT

[75] Inventor: Peter D. Rail, Plano, Tex.

[73] Assignee: Electronic Data Systems Corporation, Plano, Tex.

[21] Appl. No.: 590,858

[22] Filed: Jan. 24, 1996

[51] Int. Cl.$^6$ ............................................. G06F 17/30
[52] U.S. Cl. ..................... 395/616; 395/611; 395/651; 395/652; 395/653
[58] Field of Search ........................ 395/611, 616, 395/670, 651, 652, 653

[56] References Cited

U.S. PATENT DOCUMENTS

| | | | |
|---|---|---|---|
| 5,202,983 | 4/1993 | Orita | 395/604 |
| 5,497,492 | 3/1996 | Zbikowski | 395/652 |
| 5,530,862 | 6/1996 | Wadsworth | 395/651 |
| 5,535,411 | 7/1996 | Speed et al. | 395/652 |
| 5,548,757 | 8/1996 | Matsuyama et al. | 395/616 |
| 5,565,054 | 10/1996 | Bramnick et al. | 395/652 |
| 5,640,562 | 6/1997 | Wold | 395/652 |

OTHER PUBLICATIONS

"Using C" by Lee and Mark Atkinson, Que Corporation, 11711 N. College Ave., Carmel, IN 46032, pp. 24–25 and 175–176 Jan. 1990.

*Primary Examiner*—Thomas G. Black
*Assistant Examiner*—Diane Mizrahi
*Attorney, Agent, or Firm*—Barton E. Showalter; L. Joy Griebenow

[57] ABSTRACT

A computing system (10) includes a program (16) that performs processing tasks. A configuration file manager (22) generates configuration information for the program (16) using an environment (26) and configuration files (28, 30, 32). Parameter expressions in the environment (26) and configuration files (28, 30, 32) are arranged in a hierarchy to promote organization and management of configuration information.

23 Claims, 4 Drawing Sheets

1

CONFIGURATION FILE MANAGEMENT

TECHNICAL FIELD OR THE INVENTION

This invention relates in general to the field of computing systems, and more specifically to configuration file management in computing systems.

BACKGROUND OF THE INVENTION

Computing systems execute programs to perform processing tasks. Programs may access hard-coded parameters to perform these tasks or generate parameters during execution. However, some computing systems maintain parameters separate from or external to the program and provide access to these parameters for program execution. For example, computing systems running in an MS-WINDOWS environment may support control or configuration files that store parameters for access by programs during execution.

As computing systems become larger and more complex, configuration files and their contents become more numerous and difficult to manage and organize. A typical computing system may include tens or hundreds of these configuration files scattered throughout the system with little or no overall organization. Furthermore, computing systems that run different programs may include configuration files for one program that duplicate or conflict with configuration files for another program. Therefore, a need exists for configuration file management in computing systems.

SUMMARY OF THE INVENTION

In accordance with the present invention, the disadvantages and problems associated with configuration file management in computing systems have been substantially reduced or eliminated. The present invention performs configuration file management by establishing a hierarchy or nesting of configuration files.

In accordance with one embodiment of the present invention, a computing system includes a program that performs processing tasks and that accesses configuration information for program execution. A first configuration file includes first parameter expressions. A second configuration file specified in the first configuration file includes second parameter expressions. A configuration file manager coupled to the first configuration file and the second configuration file generates configuration information for the program using the first parameter expressions and the second parameter expressions.

In accordance with another embodiment of the present invention, a method for executing a program comprises processing first parameter expressions in a first configuration file. In response to an include statement in the first configuration file, second parameter expressions in a second configuration file are processed. The processed first parameter expressions and the processed second parameter expressions are stored as configuration information. The program is executed using the configuration information.

Important technical advantages of the present invention include configuration file management that reduces configuration file duplication and conflict by arranging configuration files in a hierarchy. A configuration file may have one or more include statements that incorporate other configuration files. An incorporated configuration file may also incorporate other configuration files to create a structured hierarchy from the most specific configuration file to the most general configuration file. In such a manner, a parameter value in a specific configuration file overrides a parameter value in a more general configuration file. In a particular embodiment, the most general configuration information includes environmental parameters assigned in a shell program. The organization of configuration files into a hierarchy reduces content duplication and conflict, reduces storage requirements and the number and size of configuration files, and provides a central point of control for program parameters.

Other technical advantages include composite parameters and parameter expressions that support arithmetic operations. Still another technical advantage includes a configuration file manager written in portable source code, such as ANSI-standard C, that can run on different operating systems. Other technical advantages are readily apparent to one skilled in the art from the following figures, descriptions, and claims.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE INVENTION

Figure 1:
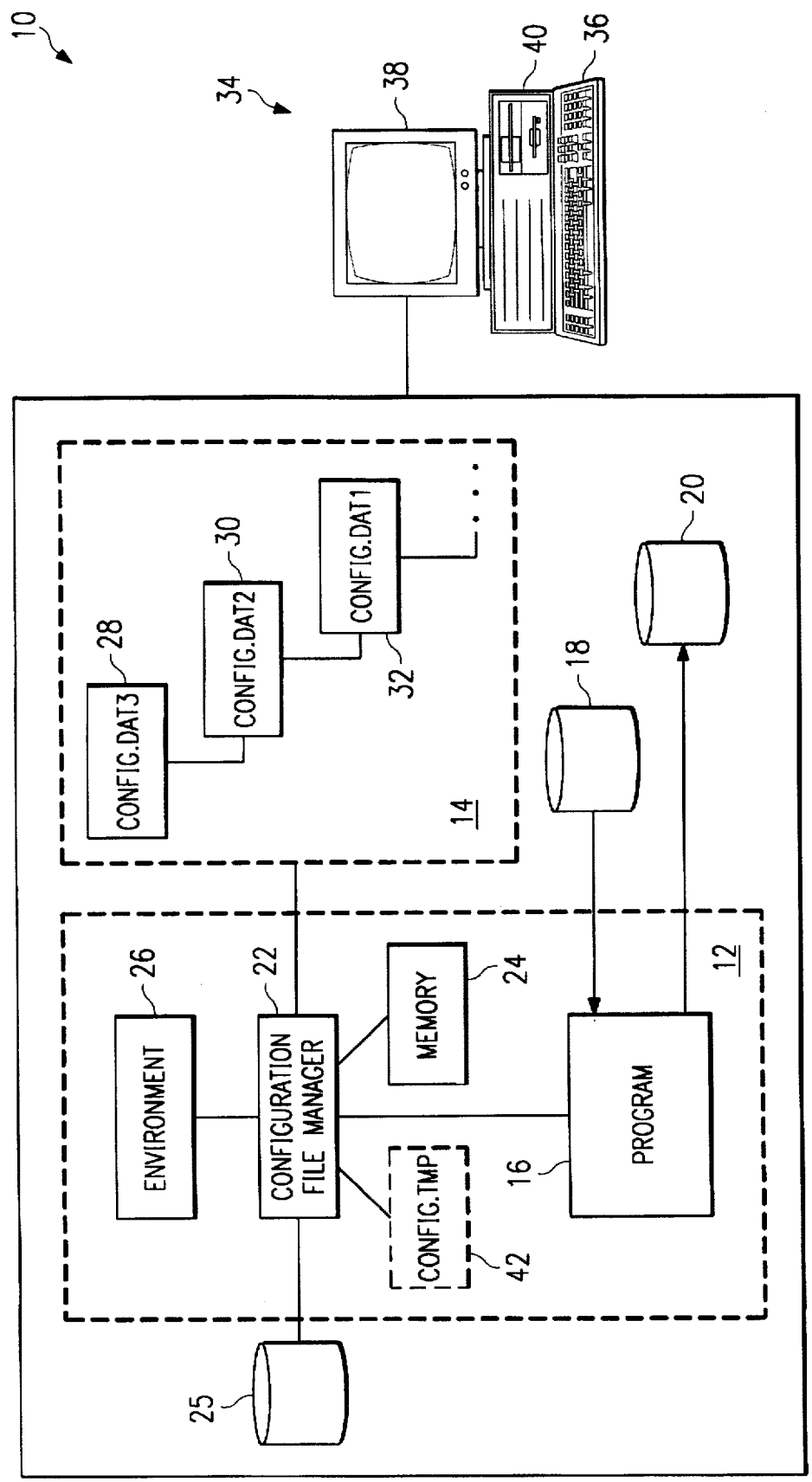
FIG. 1 illustrates a computing system having a configuration file manager in accordance with the present invention.

FIG. 1 illustrates a computing system 10 for performing processing tasks. Computing system 10 includes a process space 12 and a storage space 14. In general, computing system 10 accesses configuration files in storage space 14 to prepare configuration information for access by programs executed in process space 12.

Process space 12 comprises processing and storage capabilities of computing system 10 that allow execution of a program 16. Process space 12 comprises one or more processes, running sequentially or simultaneously, that execute one or more programs 16, manage resources of computing system 10, or perform other processing tasks. Process space 12 may comprise a shell program that interfaces with a user of computing system 10 through prompts, graphical interfaces, or other interfacing functions. Program 16 is coupled to an input file 18 that provides information to program 16 to perform processing tasks. For example, input file 18 may contain transaction records or customer account information for processing by program 16. Program 16 is also coupled to output file 20 to store information generated by program 16. For example, output file 20 may contain processed transaction records, summary customer reports, bills, or other output information generated by program 16.

A configuration file manager 22 is coupled to program 16 and provides parameters to program 16. In one embodiment, configuration file manager 22 provides parameters to program 16 during execution. The parameters are stored in memory 24 as configuration information. Configuration file manager 22 also maintains a log file 25 to monitor and debug the creation, management, and provisioning of configuration information by configuration file manager 22.

Configuration file manager 22 is coupled to environment 26 and storage space 14. Environment 26 comprises environmental parameters established by computing system 10 in process space 12. A shell program or other process can establish, modify, or provide access to environmental parameters in environment 26. Configuration file manager 22 generates configuration information to store in memory 24 using environment 26 and configuration files 28, 30, and 32. An important aspect of the present invention is the hierarchical arrangement of environment 26 and configuration files 28, 30, and 32, as described below in more detail with reference to FIG. 2.

Computing system 10 may operate on one or more computers shown generally as computer 34. Computer 34 includes an input device 36, such as a keypad, touch screen, or other device that can accept information. Output device 38 conveys information associated with the operation of computing system 10, including digital data, visual information, or audio information. Both input device 36 and output device 38 may include fixed or removable storage media, such as magnetic computer disks, CD-ROM, or other suitable media to receive output from or to provide input to computing system 10. Processor 40 and its associated volatile or nonvolatile memory execute instructions and manipulate information in accordance with the operation of computing system 10. In a particular embodiment, computing system 10 comprises one or more computers operating in a UNIX environment.

Some configuration files, such as files ending in the suffix "INI" used in the MS-WINDOWS environment, are ASCII files that contain configuration information for program 16. However, computing system 10 may use any type of file, database, list, or other suitable structure of information to maintain system control information or configuration information that is not to be hard-coded in program 16. DOS, MS-WINDOWS, UNIX, VMS, and other computing environments also support scripts or batch files that can communicate configuration information to program 16 for execution. In one embodiment, configuration file manager 22 may be written in a portable source code, such as ANSI-standard C, that can compile and run on these different operating systems. The portability of configuration file manager 22 allows configuration information to be exchanged and managed across computing platforms.

In operation, configuration file manager 22 generates configuration information and provides program 16 access to this configuration information. This is accomplished by processing parameter expressions in environment 26 and configuration files 28, 30, and 32. In a particular embodiment, a user initiates a processing task by specifying program 16 and configuration file 32, which contains configuration information to be used by program 16. Through the use of include statements described below with reference to FIG. 2, configuration file 32 incorporates parameter expressions from configuration file 30, and configuration file 30 incorporates parameter expressions from configuration file 28. In such a manner, computing system 10 arranges parameter expressions in a hierarchy of configuration files, from the most general configuration file 28 to the most specific configuration file 32. Configuration file manager 22 may also access environmental parameter expressions in environment 26, which may represent the most general configuration information.

Configuration file manager 22 stores generated configuration information in memory 24 and also stores printable information in log file 25 for purposes of monitoring and debugging the configuration information. Program 16 accesses configuration information stored in memory 24 by requesting the information from configuration file manager 22. Configuration file manager 22 acts as an agent for program 16 and supplies the requested configuration information from memory 24.

In one embodiment, configuration file manager 22 dynamically inserts new configuration information in memory 24 during execution of program 16. Similarly, configuration file manager 22 may generate one or more temporary configuration files 42 with inserted parameter expressions for processing and storage as configuration information in memory 24. Changes to the configuration information stored in memory 24, either directly or using temporary configuration file 42, are only in effect while program 16 is still executing. This allows dynamic modification and supplementation of configuration information stored in memory 24 without permanently modifying environment 26 or configuration files 28, 30, and 32.

Figure 2:
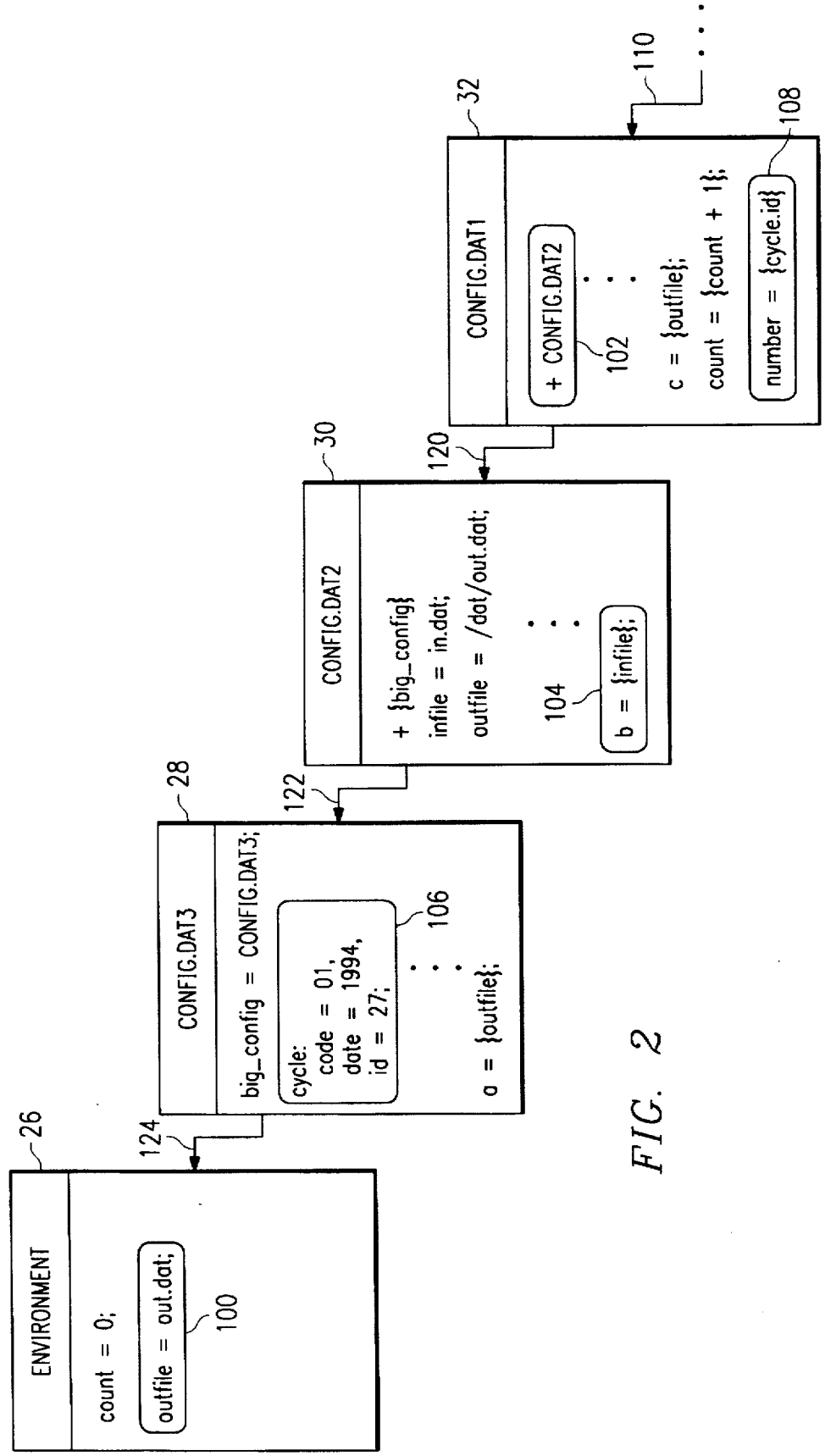
FIG. 2 illustrates a hierarchy of configuration files and environmental parameters in accordance with the present invention.

FIG. 2 illustrates a hierarchy of environment 26 and configuration files 28, 30, and 32. In a particular embodiment, environment 26 is considered the most general configuration file. Therefore, the hierarchy shown in FIG. 2 from most general to most specific is as follows: environment 26, configuration file 28 (CONFIG.DAT3), configuration file 30 (CONFIG.DAT2), and configuration file 32 (CONFIG.DAT1). Additional and more specific configuration files may be added, as indicated by arrow 110.

Environment 26 and configuration files 28, 30, and 32 each contain parameter expressions that specify configuration information. Configuration information may specify input file 18 that program 16 is to access during execution. Likewise, configuration information supplied to program 16 by configuration file manager 22 may specify output file 20. In general, configuration information may include file names, program settings, storage or processing specifications, run time specific information, customer information, record information, control information, or any other information that is not hard-coded into program 16.

There are generally three types of parameter expressions illustrated in FIG. 2: an assignment statement, an include statement, and an evaluation statement. An assignment statement, such as assignment statement 100 in environment 26, assigns a value to a parameter. In one embodiment, the syntax for assignment statement 100 includes a parameter name (outfile) and its assigned value (out.dat) separated by an equal sign. Assignment statement 100 may terminate in a new line character, and end-of-file marker, a semicolon, or any other appropriate delimiter.

An include statement, such as include statement 102 in configuration file 32, specifies a higher level configuration file whose contents are to be included in the configuration information. In one embodiment, the syntax for include statement 102 begins with a plus sign (+) followed by the file specification of the included configuration file (CONFIG.DAT2). Upon encountering an include statement, configuration file manager 22 processes the included configuration file before continuing processing of the current configuration file. In a particular embodiment, include statements appear at the beginning of the current configuration file so that processing of the included configuration file occurs before processing the current configuration file.

An evaluation statement, such as the evaluation statement used in assignment statement 104 in configuration file 30, recalls the value of a parameter. In this particular embodiment, the evaluation statement syntax places a parameter name between brackets ({infile}). Parameter expressions may include an evaluation statement in combination with an assignment statement or an include statement.

Assignment statements, include statements, and evaluation statements may operate on single parameters or composite parameters. A single parameter, such as "outfile" specified in assignment statement 100 in environment 26, relates a single parameter to a single value. A composite parameter, such as "cycle" specified in assignment statement 106 in configuration file 28, includes a parameter name (cycle), several subparameter names (code, date, id), and a value for each subparameter name (01, 1994, 27). As shown in assignment statement 108 in configuration file 32, the parameter name (cycle) and subparameter name (id) are concatenated and separated by a period to indicate the specific subparameter name. The use of both single parameters and composite parameters provides additional flexibility and structure to the configuration information in computing system 10.

Using the arrangement of environment 26 and configuration files 28, 30, and 32 shown in FIG. 2, a user initiates execution of program 16 and specifies configuration file 32. In a specific example, a user inputs "BILL CONFIG.DAT1" at the prompt of a shell program which invokes program 16 (BILL) using the specified configuration file 32 (CONFIG.DAT1). The execution of program 16 and the specification of configuration file 32 may be accomplished with or without user intervention, by executing batch files, launching one or more processes, or using any other appropriate techniques.

Configuration file manager 22 begins processing configuration file 32 by reading the first parameter expression. Include statement 102 (+CONFIG.DAT2) causes configuration file manager 22 to proceed to processing configuration file 30, as indicated by arrow 120. Configuration file manager 22 then encounters another include statement (+{big_config}) at the beginning of configuration file 30. Configuration file manager 22 processes the evaluation statement ({big_config}) and commences processing of configuration file 28 (CONFIG.DAT3), as indicated by arrow 122. If configuration file manager 22 considers environment 26 the highest level configuration file, then configuration file manager 22 proceeds to environment 26 to process environmental parameters, as indicated by arrow 124.

In this particular example, configuration file manager 22 establishes the hierarchy of configuration information before processing additional assignment or evaluation statements. Processing of assignment and evaluation statements proceeds as follows: environment 26, configuration file 28, configuration file 30, and configuration file 32. In this manner, any parameter values specified by specific configuration files override values set by more general configuration files.

In a particular embodiment, environmental parameters in environment 26 establish system defaults that relate to hardware configuration, specific software drivers, and other system defaults. Configuration file 28 specifies defaults for particular applications, such as billing, accounts payable, accounts receivable, and others. Configuration file 30 further specifies application defaults. For example, if configuration file 28 specifies a billing application, then configuration file 30 specifies defaults for the rating portion of the billing application. Configuration file 32 includes even more specific configuration information, such as customer information, record information, cycle information, or other information specific to a particular execution event of program 16. As shown by continuation line 110, the hierarchy and specificity can continue by adding additional configuration files.

The override feature of the hierarchical configuration file structure provides several advantages. Specific configuration files may specify differences or deltas from parameters set in more general configuration files. However, specific configuration files need not duplicate default information contained in more general configuration files. This organization reduces content duplication and conflict, reduces storage requirements and the number and size of configuration files, and provides a central point of control for program parameters.

Exemplary parameter expressions in FIG. 2 illustrate the hierarchical processing of configuration information. For example, to evaluate the expression "c={outfile}" in configuration file 32, configuration file manager 22 first considers other parameter expressions in configuration file 32. Since configuration file 32 does not assign a value to "outfile," configuration file manager 22 proceeds to configuration file 30 (CONFIG.DAT2) in response to include statement 102. Configuration file manager 22 finds the assignment statement "outfile=/dat/out.dat" in configuration file 30 and assigns this value to parameter "c." The value assigned to "outfile" in configuration file 30 overrides the value assigned to outfile in environment 26.

In another example, configuration file manager 22 evaluates the expression "a={outfile}" in configuration file 28 by first considering statements within configuration file 28. Assuming configuration file manager 22 considers environmental parameters in environment 26 to be the most general configuration information, the search for the value of "outfile" proceeds to environment 26. Configuration file manager 22 encounters assignment statement 100 in environment 26 and assigns the corresponding value to parameter "a." The value of "outfile" in configuration file 28 (out.dat) is different from the value of "outfile" in configuration file 32 (/dat/out.dat) due to the assignment of "outfile" in configuration file 30. These results illustrate the override feature and the hierarchical arrangement of configuration information in computing system 10.

The evaluation of assignment statement 108 in configuration file 32 illustrates the use of the composite parameter "cycle.id." Configuration file manager 22 first considers assignment statements in configuration file 32. By virtue of include statements, configuration file manager 22 proceeds to configuration file 30 and then to configuration file 28. In configuration file 28, configuration file manager 22 detects assignment statement 106 having parameter name "cycle" and subparameter "id" and assigns the corresponding value to "number."

Figure 3:
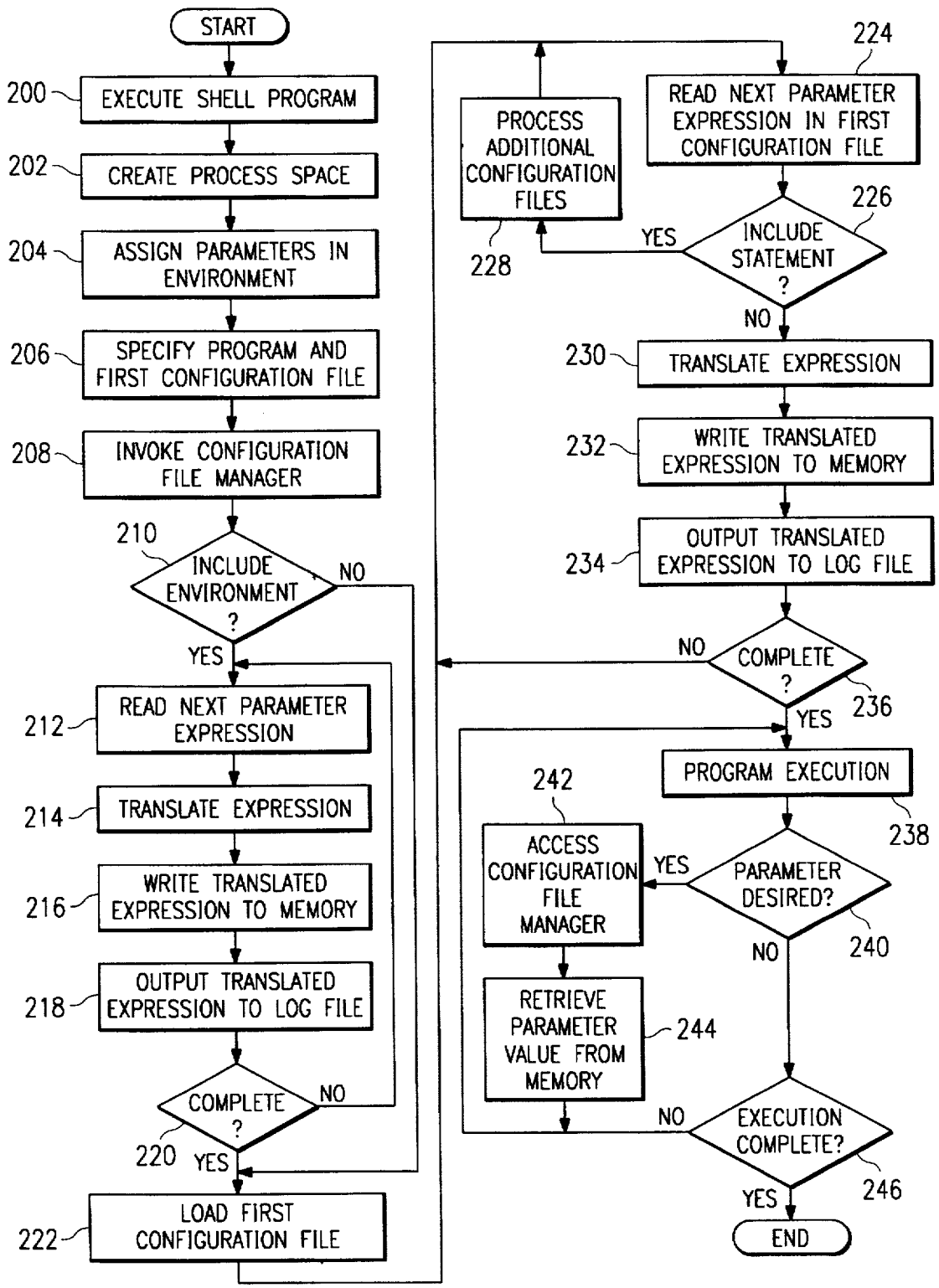
FIG. 3 illustrates a flow chart of a method for executing a program using the configuration file manager in accordance with the present invention.

FIG. 3 illustrates a flow chart for executing program 16 using configuration information. The method begins at step 200 by executing a shell program. The shell program provides user interaction with any suitable operating system, such as DOS, MS-WINDOWS, UNIX, VMS, or any other appropriate computing environment. Process space 12 is then created at step 202 by allocating storage and processing capabilities of computing system 10. In some computing environments, this step may be unnecessary or may be performed in parts as program 16, configuration file manager 22, memory 24, and environment 26 utilize the storage and processing capabilities of computing system 10. During execution of the shell program at step 200 or through later user interaction, scripting, or other suitable method, environmental parameters in environment 26 are assigned values at step 204. A user specifies program 16 and first configuration file 32 at step 206. The method invokes configuration file manager 22 at step 208.

If environmental parameters in environment 26 are to be included in configuration information at step 210, then configuration file manager 22 reads the next parameter expression in environment 26 at step 212. Configuration file manager 22 translates the parameter expression at step 214, writes the translated expression in memory 24 at step 216, and outputs the translated expression in printable format to log file 25 at step 218. If processing of environmental parameters in environment 26 is not complete at step 220, then configuration file manager 22 proceeds to the next parameter expression in environment 26 beginning at step 212. Depending on the structure of environment 26 and the operating system used by computing system 10, some or all of steps 212, 214, and 216 may not be necessary to process configuration information from environment 26.

Whether environment 26 is included or not, configuration file manager 22 loads first configuration file 32 at step 222. Configuration file manager 22 then reads a parameter expression in first configuration file 32 at step 224. If the parameter expression is an include statement at step 226, then configuration file manager 22 proceeds to process additional configuration files at step 228. Step 228 is described in more detail below with reference to FIG. 4. After processing additional configuration files at step 228, configuration file manager 22 reads the next parameter expression in configuration file 32 at step 224.

If the parameter expression in configuration file 32 is not an include statement, configuration file manager 22 translates the parameter expression at step 230. Translation of parameter expressions in environment 26 or configuration files 28, 30, and 32 may involve the evaluation and assignment of a value to a parameter, as well as arithmetic operations on numeric parameters. For example, configuration file manager 22 translates the parameter expression "count={count+1}" in configuration file 32 of FIG. 2 by first determining the current value of the parameter "count" as indicated in environment 26. Configuration file manager 22 then increments the determined value and assigns the incremented value to the parameter "count." Step 230 may also involve the formatting of information from a printable text format, such as ASCII, into a machine format for storage in memory 24.

Configuration file manager 22 writes the translated expression to memory 24 at step 232. For purposes of monitoring and debugging the generation of configuration information, configuration file manager 22 outputs the translated expression in printable format to log file 25 at step 234. If processing of first configuration file 32 is not complete at step 236, then configuration file manager 22 continues processing first configuration file 32 by reading the next parameter expression at step 224.

After processing environment 26, configuration file 32, and any additional configuration files, program 16 begins execution at step 238. If program 16 desires a parameter value at step 240, then program 16 accesses configuration file manager 22 at step 242 to retrieve the parameter value from memory 24 at step 244. If no parameter value is desired at step 240 and execution of program 16 has not completed at step 246, then program execution at step 238 continues. The method ends when program execution is complete at step 246.

Figure 4:
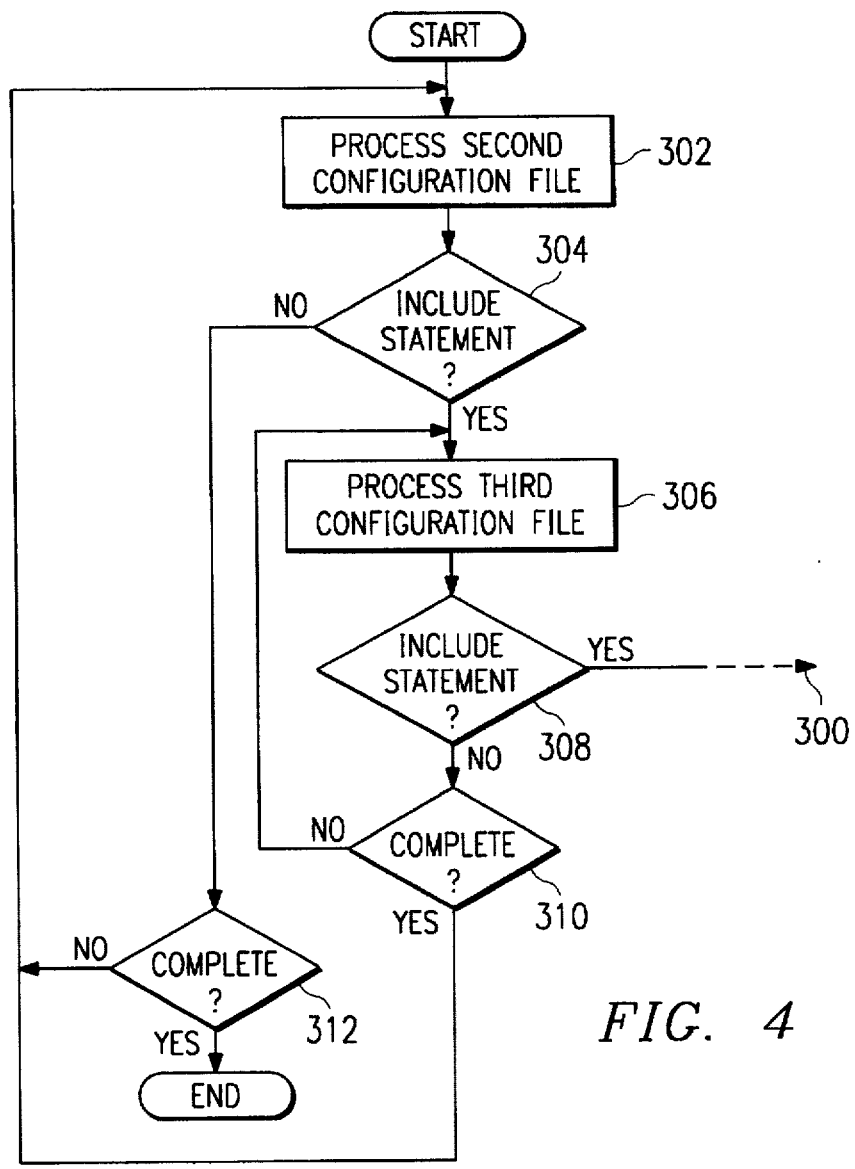
FIG. 4 illustrates a flow chart of a method for processing additional configuration files in accordance with the present invention.

FIG. 4 illustrates in more detail step 228 for processing additional configuration files. In particular, FIG. 4 illustrates processing of second configuration file 30 and third configuration file 28, but configuration file manager 22 may process additional configuration files as indicated by arrow 300. The method begins at step 302 where configuration file manager 22 processes second configuration file 30 using a similar method as indicated by steps 224, 230, 232, 234, and 236 in FIG. 3 for processing configuration file 32. If configuration file manager 22 encounters an include statement while processing second configuration file 30 at step 304, then configuration file manager 22 processes third configuration file 28 specified in the include statement at step 306.

Configuration file manager 22 processes third configuration file 28 using a similar method as indicated by steps 224, 230, 232, 234, and 236 in FIG. 3 for processing configuration file 32. If configuration file manager 22 encounters an include statement during processing of third configuration file 28 at step 308, then additional configuration files may be processed as indicated by arrow 300. If processing of third configuration file 28 is not complete at step 310, then processing continues at step 306. If processing of third configuration file 28 is complete at step 310, then configuration file manager 22 continues processing parameter expressions in second configuration file at step 302. Assuming no additional include statements at step 304, configuration file manager 22 continues processing second configuration file 30 until completed at step 312.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A computing system, comprising:
    a program operable to perform processing tasks, the program further operable to access configuration information for program execution;
    a first configuration file having a plurality of first parameter expressions;
    a second configuration file specified in the first configuration file, the second configuration file having a plurality of second parameter expressions; and
    a configuration file manager coupled to the first configuration file and the second configuration file, the configuration file manager operable to generate configuration information for the program using the first parameter expressions and the second parameter expressions.

2. The computing system of claim 1, wherein one of the first parameter expressions that specifies a first value of a parameter overrides one of the second parameter expressions that specifies a second value of the parameter.

3. The computing system of claim 1, wherein the first configuration file comprises an include statement that specifies the second configuration file.

4. The computing system of claim 3, wherein the include statement is placed at the beginning of the first configuration file such that processing of the include statement occurs before processing of the remaining first parameter expressions.

5. The computing system of claim 1, further comprising a memory to store configuration information for access by the configuration file manager during program execution.

6. The computing system of claim 1, further comprising environmental parameters, wherein the configuration file manager is operable to generate configuration information for the program using the first parameter expressions, the second parameter expressions, and the environmental parameters.

7. The computing system of claim 1, wherein the configuration file manager is written in portable source code operable to run on different operating systems.

8. The computing system of claim 1, wherein at least one of the first parameter expressions and the second parameter expressions comprises a composite parameter.

9. A method for executing a program, comprising:

processing a plurality of first parameter expressions in a first configuration file;

processing, in response to an include statement in the first configuration file, a plurality of second parameter expressions in a second configuration file, wherein the second configuration file is hierarchically more general than the first configuration file;

storing the processed first parameter expressions and the processed second parameter expressions as configuration information; and executing the program using the stored configuration information.

10. The method of claim 9, wherein one of the first parameter expressions that specifies a first value of a parameter overrides one of the second parameter expressions that specifies a second value of the parameter.

11. The method of claim 9, further comprising the step of specifying the first configuration file in a program statement.

12. The method of claim 9, wherein the step of processing a plurality of first parameter expressions comprises:

reading a first parameter expression in the first configuration file;

determining if the first parameter expression is an include statement; and translating the first parameter expression if the first parameter expression is not an include statement.

13. The method of claim 9, wherein the step of processing a plurality of first parameter expressions comprises:

reading a first parameter expression in the first configuration file;

translating the first parameter expression;

writing the translated expression to memory; and outputting the translated expression to a log file.

14. The method of claim 9, wherein the step of generating configuration information comprises generating configuration information using first parameter expressions, second parameter expressions, and environmental parameters.

15. The method of claim 9, wherein the step of executing the program comprises:

accessing the configuration file manager when the program desires configuration information;

retrieving the desired configuration information using the configuration file manager; and communicating the desired configuration information to the program.

16. The method of claim 9, wherein the include statement is placed at the beginning of the first configuration file such that processing of the include statement occurs before processing of the remaining first parameter expressions.

17. A method for establishing configuration information for a program, comprising:

specifying a first configuration file;

invoking a configuration file manager;

processing, in response to an include statement in the first configuration file, a plurality of second parameter expressions in a second configuration file using the configuration file manager;

processing a plurality of first parameter expressions in the first configuration file using the configuration file manager; and storing in memory the processed first parameter expressions and the processed second parameter expressions as configuration information.

18. The method of claim 17, wherein one of the first parameter expressions that specifies a first value of a parameter overrides one of the second parameter expressions that specifies a second value of the parameter.

19. The method of claim 17, wherein the step of processing a plurality of first parameter expressions comprises:

reading a first parameter expression in the first configuration file;

determining if the first parameter expression is an include statement; and translating the first parameter expression if the first parameter expression is not an include statement.

20. The method of claim 17, wherein the step of processing a plurality of first parameter expressions comprises:

reading a first parameter expression in the first configuration file;

translating the first parameter expression;

writing the translated expression to memory; and outputting the translated expression to a log file.

21. The method of claim 17, wherein the step of generating configuration information comprises generating configuration information using first parameter expressions, second parameter expressions, and environmental parameters.

22. The method of claim 17, further comprising the step of processing, in response to an include statement in the second configuration file, a plurality of third parameter expressions in a third configuration file, wherein one of the second parameter expressions that specifies a second value of a parameter overrides one of the third parameter expressions that specifies a third value of the parameter.

23. The method of claim 17, wherein the include statement is placed at the beginning of the first configuration file such that processing of the include statement occurs before processing of the remaining first parameter expressions.

* * * * *